(12) United States Patent
Langford

(10) Patent No.: US 7,725,718 B2
(45) Date of Patent: May 25, 2010

(54) AUTHENTICATING IMAGES IDENTIFIED BY A SOFTWARE APPLICATION

(76) Inventor: Ronald Neville Langford, 15 Browning Blvd., Battery Hill, Queensland (AU) 4551

( * ) Notice: Subject to any disclaimer, the term of this patent is extended or adjusted under 35 U.S.C. 154(b) by 1317 days.

(21) Appl. No.: 11/154,239

(22) Filed: Jun. 16, 2005

(65) Prior Publication Data

US 2005/0283609 A1    Dec. 22, 2005

(30) Foreign Application Priority Data

Jun. 17, 2004  (AU)  ............................ 2004903257
Jul. 13, 2004  (AU)  ............................ 2004903805
Jul. 14, 2004  (AU)  ............................ 2004903831

(51) Int. Cl.
*H04L 9/32*       (2006.01)

(52) U.S. Cl. .................. 713/170; 713/181; 726/21; 726/30; 705/51; 707/10

(58) Field of Classification Search ............... 713/170, 713/175, 176, 181; 726/21, 30; 707/9, 10; 705/51, 56

See application file for complete search history.

(56) References Cited

U.S. PATENT DOCUMENTS

| 6,278,791 | B1 | 8/2001 | Honsinger |
| 7,146,502 | B2 * | 12/2006 | Hayashi ...................... 713/176 |
| 7,475,246 | B1 * | 1/2009 | Moskowitz et al. .......... 713/169 |
| 2001/0021978 | A1 | 9/2001 | Okayasu et al. |
| 2001/0023457 | A1 | 9/2001 | Tack-don et al. |
| 2002/0010656 | A1 | 1/2002 | Suib |
| 2003/0018667 | A1 | 1/2003 | Hoehn et al. |

FOREIGN PATENT DOCUMENTS

| EP | 1160644 A2 | 12/2001 |
| EP | 1160644 A3 | 12/2001 |
| JP | 11-212998 A | 8/1999 |
| JP | 11-232293 A | 8/1999 |
| JP | 2002-262163 A | 9/2002 |
| WO | WO-01/01287 A2 | 1/2001 |
| WO | WO-01/53966 A1 | 7/2001 |
| WO | WO-02/054274 A1 | 7/2002 |

OTHER PUBLICATIONS

European Search Report for Application No. EP05253717 dated Jan. 9, 2008.

* cited by examiner

*Primary Examiner*—Michael Pyzocha
*Assistant Examiner*—Paul Callahan
(74) *Attorney, Agent, or Firm*—Tucker Ellis & West LLP

(57) ABSTRACT

Method 300 facilitates the authentication of images, for example on a web-site (380). The method includes encoding images (310). In one embodiment, a search request is received (330) from a terminal (340) and the Internet is searched (350) in accordance with the search request and one or more web-sites identified (if any). An image associated with the identified web-site is checked (360) to see if the image is authentic. This can be achieved by decoding the image to obtain embedded identification information. If the image is authenticated, the image is transmitted (390) as part of a search results list. If the image is not authenticated, the image is not transmitted (395) or a warning that the image has not been authenticated can be provided. A method which facilitates the authentication of an email or other type of electronic document is also disclosed.

34 Claims, 6 Drawing Sheets

AUTHENTICATING IMAGES IDENTIFIED BY A SOFTWARE APPLICATION

TECHNICAL FIELD

The present invention relates to authenticating images, or other visual content, obtained from a network, for example by Internet searching or receiving an electronic document, and in particular, to a method of and system for facilitating the authentication of a web-site identified in a search by seeking to authenticate one or more images associated with the web-site. The present invention also relates to a computer readable medium of instructions, such as software, for giving effect to aspects of the present invention.

BACKGROUND ART

Disclosed in International Patent Application No. PCT/AU01/01185 (Publication No. WO 02/29623), filed by the present inventor and applicant, is an invention which provides a web-page (or web-site) search results list which includes either related or unrelated images from the actual web-pages or web-sites identified in a user's search, or images associated with the actual organisation operating a web-site. This assists a user to locate web-pages of interest or relevance to the user by providing images to assess the relevance of web-pages identified in a search, prior to the user having to hyperlink to the actual web-page itself. The present invention provides significant improvements and advantages over this prior invention. The disclosures in document WO 02/29623 are incorporated herein by cross-reference.

A search engine is a program that returns a list of web-pages that match some user selected criteria or search request. Generally, a user connects to a search engine web-site and progressively narrows the scope of the search by selecting category items with mouse-clicks, and/or enters a search term to be matched against a database. Both of these methods are hereinafter referred to as a search request.

Many images are used on web-sites but little attention has been given to-date on perhaps the most potentially damaging aspect of Internet e-commerce. The unauthorised use or application of icons, visual images or visual content has the potential to subtly direct Internet users to web-sites or web-pages which may deceive users into thinking they are genuine.

The term "image", as used herein should be understood as a reference to any type or form of image, visual content, video, animation, icon, logo, trade mark, advertisement, textual information, or the like.

Despite the extensive use of visual images on the Internet, relatively little attention has been given to being able to authenticate and/or prove ownership of material, for example visual or distinctive text such as copyright material or other proprietary types highlighted by ™, ®, © and the like. People may either ignore, alter slightly or cut and paste sections so as to create the impression of their own self creation or ownership. For example, a web-site, web-page or certain sections thereof can be copied without the owner's knowledge and used for alternate or unauthorised purposes. The continuing use of these practices emphasises a problem inherent in the prior art.

The advent of Internet and video telephones provides a further example of the need for a secure environment when doing on-line business so as to authenticate a visual image which could be of commercial importance, such as indicating an organisation's name. When a user employs the aid of a video telephone and images are used, there is a need to properly identify and establish that the provider of goods or services is bona fide.

For example, a fraudulent web-site which has the appearance of belonging to Ebay™ may show images of a particular item which is for sale significantly below the regular price. A potential buyer perceives a bargain and enters into a transaction thinking that the purchase money is going to a legitimate entity, whereas in reality the money may be diverted to an unauthorised account and the funds paid by the unsuspecting party are lost.

Similar deceptions may target banks, retail stores, ticket agencies for sports or musical events, in fact almost any entity which is engaged in Internet commerce or the like. URL, or equivalently domain name, owners and consumers seek the comfort of conducting genuine searches and conducting business on-line, but are suspicious of providing confidential information.

A hacker or scammer does not need to break into a bank's computer system to steal account numbers and access codes. A fake web-site can be set-up using images, logos, trade marks, slogans, etc., which are either the same or deceptively similar to images on an authentic web-site. It is known that consumers have given financial information to web-sites thinking they were authentic.

Authenticating visual content, for example images, where an organisation has spent considerable money in brand building is an important area, commercially and for consumer security.

Once an URL (Universal Resource Locator) of interest is located the user can mouse-click on an associated hyperlink and be transferred to the actual web-page, which is typically part of a web-site. Once a web-site or web-page of interest is located other options are often available.

In a related problem, it is difficult for a recipient of an email, or other type of electronic document, to authenticate the true origin of the email, or document, and whether or not the email, or document, actually originates from its purported source. A fraudulent email may solicit personal details from a recipient which could then be illegally used, for example to garner information for identity fraud. A fraudulent email, or electronic document, may include one or more fake images, for example a corporate logo etc., designed to deceive a recipient as to the origin or authority of the email or electronic document.

To assist with Internet security a "plugin" or "patch" to a web browser may be employed, and in some cases encryption scrambling functions using secure certificates, eg. using SSL (Secure Sockets Layers), are a further option. A patch or a plug-in is a self contained software component (sub or inner application) which normally adds a new or updated feature to a specific stand alone program, for example RealPlayer™ or Shockwave™. SSL is a RSA (Rivest, Shamir, Adlermin) public key encryption system which provides both encryption, authentication and message integrity. SSL is normally layered beneath application protocols such as HTTP, SMTP, Telnet, Gopher and NNTP. SSL is layered above the connection protocol TCP/IP. When SSL is implemented, Internet communications are transmitted in encrypted form. The encrypted link between a web-server and a browser remains private and integral, essential for the protection of credit card and Internet banking transactions. To obtain a SSL certificate a URL owner is required to provide specific security information and other identification details able to be authenticated.

Public/Private key encryption involves two passwords. One password is private and is used when deciphering a message, the other is public and is used for encryption, often included in a user's on-line signature or plan file. This makes the encryption more flexible, the public key is used to send an encrypted message, then the private key is used to decipher the message. Public key encryption can also be used to authenticate a message where a user encrypts the message with a private key and sends the message, as the public key is able to decipher the message. The recipient is thus guaranteed that the message has come from a genuine source. PGP (Pretty Good Privacy) and RSA are examples of public key encryptions codes.

In a networked information or data communications system, a user has access to one or more terminals which are capable of requesting and/or receiving information or data from local or remote information sources. In such a communications system, a terminal may be a type of processing system, computer or computerised device, personal computer (PC), mobile, cellular or satellite telephone, mobile data terminal, portable computer, Personal Digital Assistant (PDA), pager, video telephone, thin client, or any other similar type of digital electronic device. The capability of such a terminal to request and/or receive information or data can be provided by software, hardware and/or firmware. A terminal may include or be associated with other devices, for example a local data storage device such as a hard disk drive or solid state drive.

An information source can include a server, or any type of terminal, that may be associated with one or more storage devices that are able to store information or data, for example in one or more databases residing on a storage device. The exchange of information (i.e., the request and/or receipt of information or data) between a terminal and an information source, or other terminal(s), is facilitated by a communication means. The communication means can be realised by physical cables, for example a metallic cable such as a telephone line, semi-conducting cables, electromagnetic signals, for example radio-frequency signals or infra-red signals, optical fibre cables, satellite links or any other such medium or combination thereof connected to a network infrastructure.

The network infrastructure can include devices such as a telephone switch, base station, bridge, router, or any other such specialised network component, which facilitates the connection between a terminal and an information source. Collectively, an interconnected group of terminals, communication means, infrastructure and information sources is referred to as a network. The network itself may take a variety of forms. For example, it may be a computer network, telecommunications network, data communications network, Local Area Network (LAN), Wide Area Network (WAN), wireless network, Internetwork, Intranetwork, the Internet and developments thereof, transient or temporary networks, combinations of the above or any other type of network providing for communication between computerised, electronic or digital devices. More than one distinct network can be provided, for example a private and a public network. A network as referenced in this specification should be taken to include any type of terminal or other similar type of electronic device, or part thereof, which is rendered such that it is capable of communicating with at least one other terminal.

The Hyper-Text Mark-Up Language (HTML) and Hyper-Text Transfer Protocol (HTTP), and developments thereof, have made the Internet or World Wide Web (WWW) very accessible. The exchange of information on the Internet is further facilitated through hyper-text documents. Hyper-Text documents are unique in that they use tags to define links which, when selected, retrieve the related information from within the same document or from a new document altogether. The links are defined using HTML which provides a document formatting method which adapts in a consistent manner to any computer on which it is displayed. HTML tags are used to define various components of text, visual or audio which make up a hyper-text document, including such things as formatting and linking to other documents. HTML tags which link documents on one Internet information source to those on another do so by associating a Uniform Resource Locator (URL) with the referenced information.

This identifies a need for a method, system and/or computer readable medium of instructions for facilitating the authentication of a web-site, or at least of images or the like contained therein, which overcomes or at least ameliorates problems inherent in the prior art.

This also identifies a need for a method, system and/or computer readable medium of instructions for facilitating the authentication of an email, or other type of electronic document, or at least of images or the like contained therein, which overcomes or at least ameliorates problems inherent in the prior art.

The reference to any prior art in this specification is not, and should not be taken as, an acknowledgment or any form of suggestion that such prior art forms part of the common general knowledge.

DISCLOSURE OF INVENTION

The present invention broadly relates to an improved method (or alternatively a protocol) and/or system and/or computer readable medium of instructions for authenticating origin, ownership, validity of use and/or rights to use images or other digital content, preferably images, in relation to web-sites, search results for web-sites (or web-pages), and/or in relation to digital content, especially images, embedded or associated with an email or other type of electronic document. More generally, the present invention seeks to provide a means to authenticate visual content obtained by a software application so that a user/recipient is more confident of the source or origin of the visual content.

The present invention seeks to ameliorate or overcome problems related to "spam", "phishing", attempts to distribute viruses, identity fraud, fraudulent or fake web-sites, for example used to illegally obtain banking details, or the like.

In a first particular embodiment of the invention, there is provided a method of checking the authenticity of an identified image, the method including the steps of:
  receiving, in a software application, the identified image;
  checking if the identified image is an encoded image, whereby an encoded image includes at least an original image and link information in an encoded form; and
  if the identified image is an encoded image:
    (A) decoding the identified image to obtain the link information and a first reference image file and a second reference image file;
    (B) comparing the first reference image file and the second reference image file, and if a match is identified, providing the link information.

According to other particular, but non-limiting, aspects of the present invention it may be provided that: the identified image is firstly decoded into ciphertext and the original image; the first reference image file is obtained from the ciphertext; the second reference image file is obtained from the original image; the link information is obtained from the ciphertext; the first reference image file and the second reference image file are image hash files; the encoded image is a link image which is obtained from ciphertext and the original image; the ciphertext is firstly obtained from the link information and a reference image file formed from the original image; the software application is a web browser; the method is embodied as a plug-in to the web browser; the software application is an email program; the identified image is identified by an Internet search engine; the identified image is not an encoded image notification is provided; and/or the identified image is part of a web-site and providing the link information to the web browser allows a user to link to the web-site.

In a second particular embodiment of the invention, there is provided a method of facilitating the authentication of a web-site, the method including the steps of:

receiving an original image and link information at a server to be encoded into an encoded image;

providing a software application adapted to check if an identified image, from a search results list, is an encoded image, and if the identified image is an encoded image:

(A) decoding the identified image to obtain the link information and a first reference image file and a second reference image file; and (B) comparing the first reference image file and the second reference image file, and if a match is identified, providing the link information to enable linking to the web-site.

According to other particular, but non-limiting, aspects of the present invention it may be provided that: the search results list is obtained from a database which includes images; if the identified image is not an encoded image, the identified image is not transmitted as part of the search results list or an indication is provided in the search results list that the identified image is not authenticated; a user is able to view the identified image without being required to activate a hyperlink to the associated web-site; the identified image is a video or a sequence of images; and/or the link information is required to be validated by a remote server prior to providing the link information.

In a third particular embodiment of the invention, there is provided a system for checking the authenticity of an identified image, the system including:

a software application to receive the identified image and to check if the identified image is an encoded image, whereby an encoded image includes at least an original image and link information in an encoded form;

at least one decoder to decode the identified image to obtain the link information and a first reference image file and a second reference image file; and a comparison component to compare the first reference image file and the second reference image file, and if a match is identified, provide the link information.

In a fourth particular embodiment of the invention, there is provided a computer readable medium of instructions for checking the authenticity of an identified image, the computer readable medium of instructions performing the steps of:

receiving the identified image;

checking if the identified image is an encoded image, whereby an encoded image includes at least an original image and link information in an encoded form; and if the identified image is an encoded image:

(A) decoding the identified image to obtain the link information and a first reference image file and a second reference image file; and (B) comparing the first reference image file and the second reference image file, and if a match is identified, providing the link information.

In a fifth particular embodiment of the invention, there is provided a system for checking the authenticity of an image, the system including:

a server adapted to receive an original image and link information associated with the original image and to generate a reference image file and an encoded image;

a terminal adapted to receive an identified image, the terminal also adapted to:

check if the identified image is an encoded image;

if the identified image is an encoded image, decode the identified image to obtain the link information and at least two reference image files;

compare the at least two reference image files; and if a match is identified, use the link information.

The ability to authenticate images may need to be highlighted to include whether the images, slogans, trade marks, etc., are included in an email and whether located as a result of searching and/or trawling.

Furthermore, even the creation of key-words used in searching can be registered and authenticated according to the present invention, and thus claimed as belonging to a particular entity.

In a further specific, but non-limiting, embodiment of the present invention, there is provided a World Wide Web directory of material, either visual or textual, for example material including copyrighted, textual, photographic, trade marks, slogans, key words, artistic, architectural drawings or plans, and the like, where, after the material is uploaded to a networked system, a user is able to:

(a) Have the date and time of registration identified;

(b) Have copyrighted and creative design work contained in a database which is able to be viewed at one source rather than searching through multiple databases;

(c) Assist in reducing Internet-based intellectual property breaches and misuse;

(d) Have copyrighted material registered in countries where no provision to register is possible;

(e) Have a choice to attach a security tag to personal intellectual property; and/or, (f) Use pattern recognition technology to further enhance protection.

BRIEF DESCRIPTION OF FIGURES

The present invention should become apparent from the following description, which is given by way of example only, of a preferred but non-limiting embodiment thereof, described in connection with the accompanying figures.

MODES FOR CARRYING OUT THE INVENTION

Figure 1:
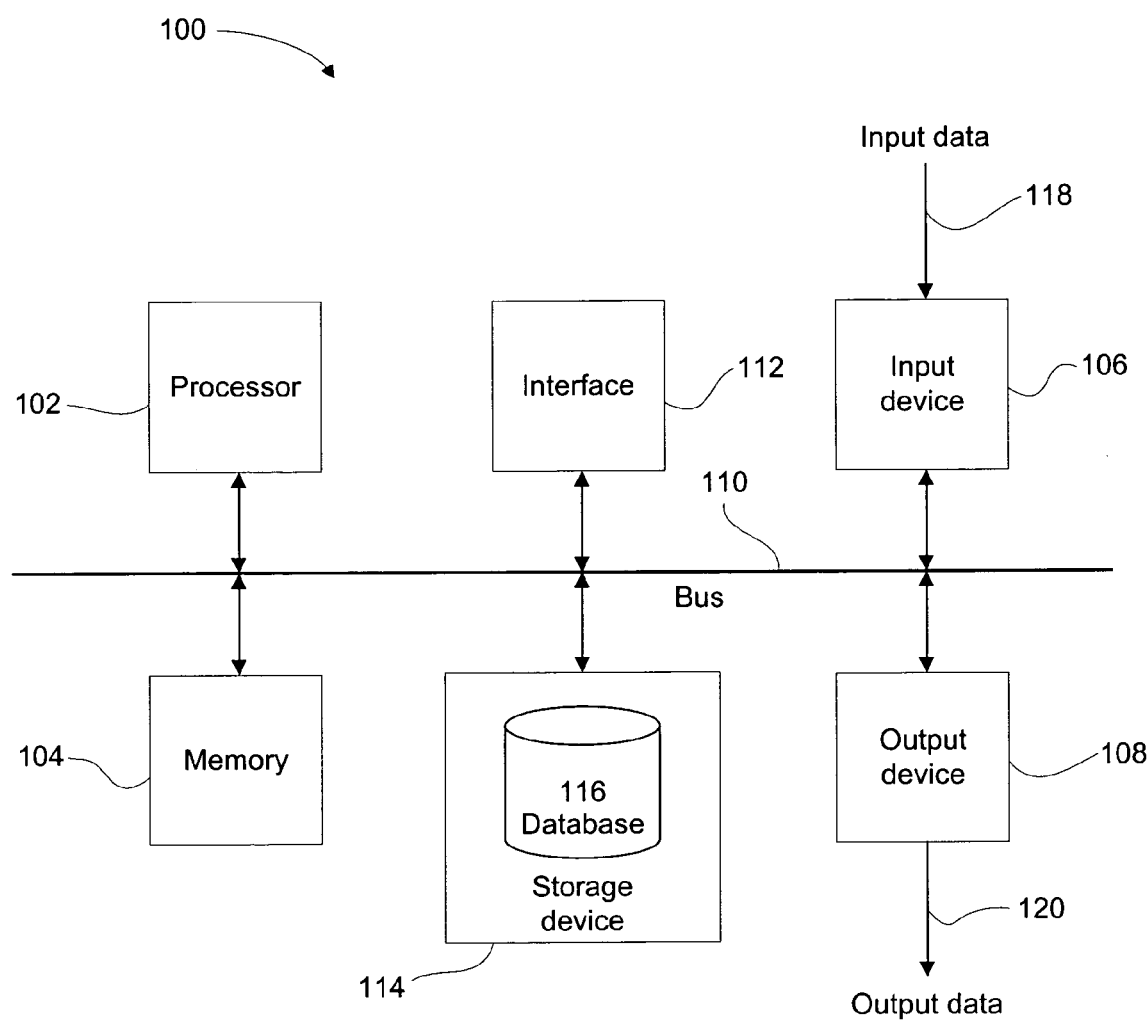
FIG. 1 illustrates an example functional block diagram of a processing system that can be utilised as part of the present invention.

The following modes, given by way of example only, are described in order to provide a more precise understanding of the subject matter of the present invention.

In the figures, incorporated to illustrate features of an embodiment of the present invention, like reference numerals are used to identify like parts throughout the figures.

A particular embodiment of the present invention can be realised using a processing system, such as a server, an example of which is shown in FIG. 1. In particular, the processing system 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 is also be provided. The memory 104 can be any form of memory device, for example, volatile or non-volatile memory, solid state storage devices, magnetic devices, etc. The processor 102 could include more than one distinct processing device, for example to handle different functions within the processing system 100.

Input device 106 receives input data 118 and can include, for example, data receiving hardware or an antenna, such as a modem or wireless data adaptor, data acquisition card, etc. Input data 118 could come from different sources, for example data received via a network. Output device 108 produces or generates output data 120 and can include, for example, a data transmitter or antenna such as a modem or wireless network adaptor, etc. Output data 120 could be transmitted to a network. A user could view data output, or an interpretation of the data output, on a terminal, for example, using a monitor or a printer. The storage device 114 can be any form of data or information storage means, for example, volatile or non-volatile memory, solid state storage devices, magnetic devices, etc.

In use, the processing system 100 is preferably a server connected to the Internet and adapted to allow data or information to be stored in and/or retrieved from, via wired or wireless communication means, the at least one database 116. The interface 112 may allow wired and/or wireless communication between the processing unit 102 and peripheral components that may serve a specialised purpose. The processor 102 receives a search request as input data 118 via input device 106 and can display search results or other output to a user by utilising output device 108. More than one input device 106 and/or output device 108 can be provided. It should be appreciated that the processing system 100 may be any form of terminal, server, specialised hardware, or the like.

Figure 2:
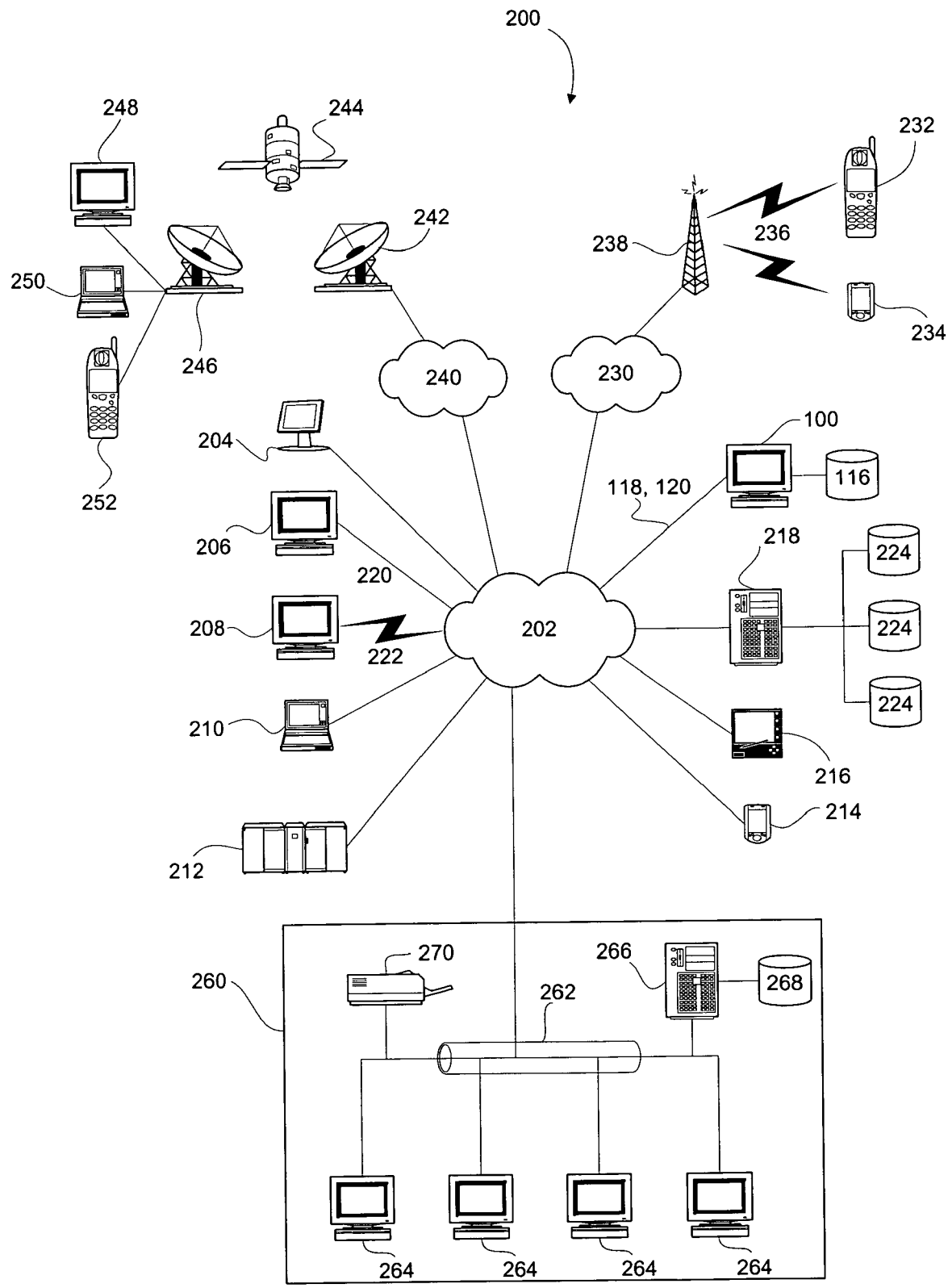
FIG. 2 illustrates an example network infrastructure that can be utilised to embody or give effect to a particular aspect of the present invention.

The processing system 100 may be a part of a networked communications system 200, as shown in FIG. 2. Processing system 100 could connect to network 202, for example the Internet or a WAN. Input data 118 and output data 120 could be communicated to other devices via network 202. Other terminals, for example, thin client 204, further processing systems 206 and 208, notebook computer 210, mainframe computer 212, PDA 214, pen-based computer 216, server 218, etc., can be connected to network 202. A large variety of other types of terminals or configurations could be utilised.

The transfer of information and/or data over network 202 can be achieved using wired communications means 220 or wireless communications means 222. Server 218 can facilitate the transfer of data between network 202 and one or more databases 224. Server 218 and one or more databases 224 provide an example of an information source.

Other networks may communicate with network 202. For example, telecommunications network 230 could facilitate the transfer of data between network 202 and mobile or cellular telephone 232 or a PDA-type device 234, by utilising wireless communication means 236 and receiving/transmitting station 238. Satellite communications network 240 could communicate with satellite signal receiver 242 which receives data signals from satellite 244 which in turn is in remote communication with satellite signal transmitter 246. Terminals, for example further processing system 248, notebook computer 250 or satellite telephone 252, can thereby communicate with network 202. A local network 260, which for example may be a private network, LAN, etc., may also be connected to network 202. For example, network 202 could be connected with ethernet 262 which connects terminals 264, server 266 which controls the transfer of data to and/or from database 268, and printer 270. Various other types of networks could be utilised.

The processing system 100 is adapted to communicate with other terminals, for example further processing systems 206, 208, by sending and receiving data, 118, 120, to and from the network 202, thereby facilitating possible communication with other components of the networked communications system 200. Various servers can host web-sites that can be accessed by processing system 100 via network 202.

Thus, for example, the networks 202, 230, 240 may form part of, or be connected to, the Internet, in which case, the terminals 206, 212, 218, for example, may be web servers, Internet terminals or the like. The networks 202, 230, 240, 260 may be or form part of other communication networks, such as LAN, WAN, ethernet, token ring, FDDI ring, star, etc., networks, or mobile telephone networks, such as GSM, CDMA or 3G, etc., networks, and may be wholly or partially wired, including for example optical fibre, or wireless networks, depending on a particular implementation.

Figure 3:
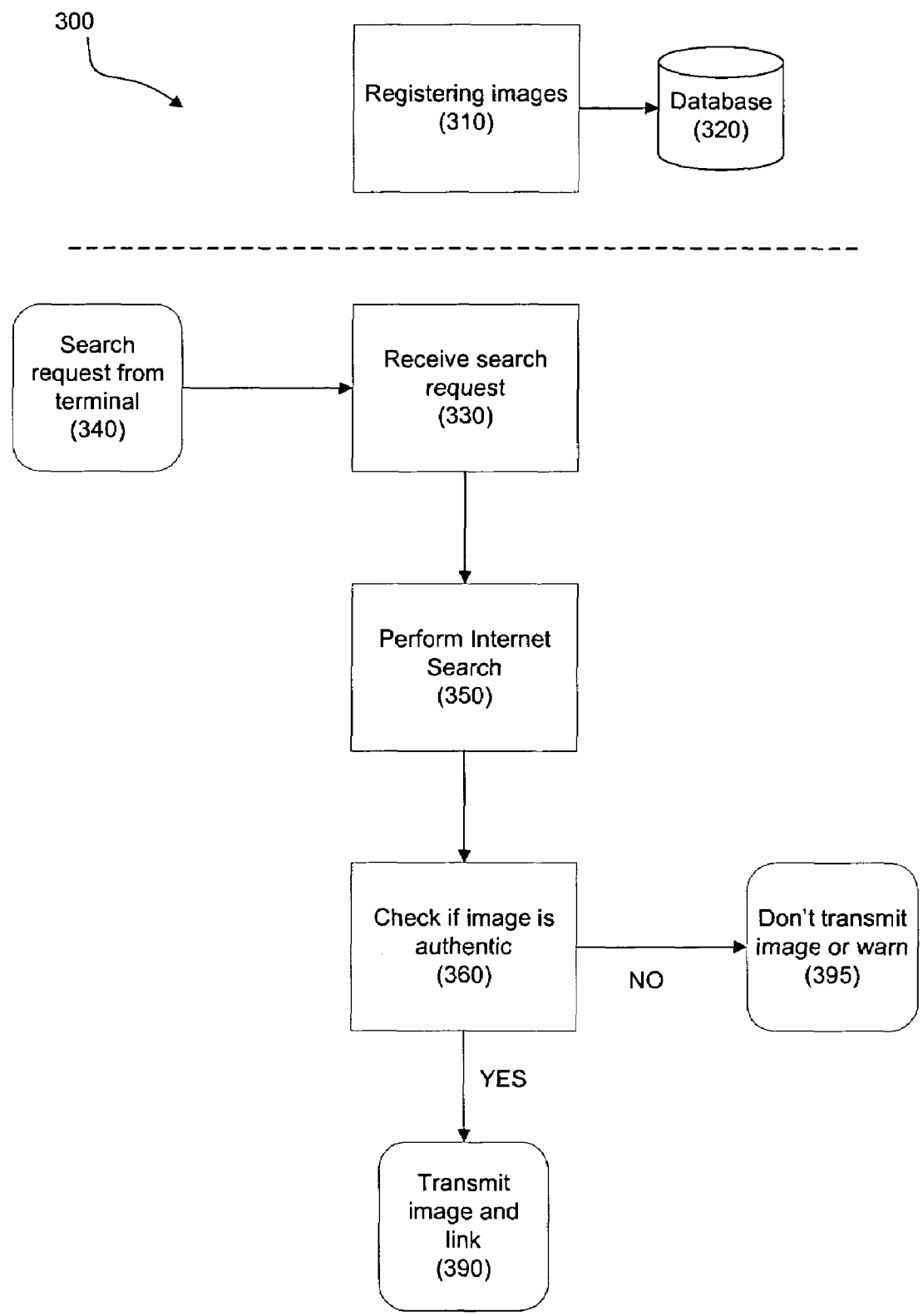
FIG. 3 illustrates an example flow diagram of a method that can be utilised to embody or give effect to a particular aspect of the present invention.

Referring to FIG. 3, method 300 facilitates the authentication of a web-site 380. The method 300 may include registering images at step 310 in a database 320. The images are registered by a person with appropriate authority by utilising registration software. In this particular embodiment, the images are associated with particular web-sites that may be identified in an Internet search. At step 330 a search request is received from a user, having been transmitted from a terminal 340. At step 350 the Internet, or other type of network or database, is searched in accordance with the search request 340 and one or more web-sites or web-pages are identified (if any). At step 360 an image associated with an identified web-site is checked to see if the image is authentic. This can be achieved by obtaining embedded identification information from an image, as is described hereinafter in more detail. If the image is authenticated, the image and an associated hyperlink can be transmitted 390 as part of a search results list to a terminal in response to the search request 340. If the image is not authenticated, the image is not transmitted 395 as part of a search results list or a warning that the image has not been authenticated can be provided in the search results list with or without the image.

According to an embodiment of the present invention, a browser plug-in is downloaded to assist in the authentication process. The plug-in could be provided free of charge to operate with Internet Explorer, Netscape or the like.

Once downloaded, the plug-in application can become permanent and has the capacity to check every image or registered phrase linked to a URL or domain name. Upon checking the validity of pre-approved security details for expiration date, etc., the plug-in can become an enforcement mechanism. Simultaneously, search engine operators can be offered the option of verifying all images which form a database of protected content, trade marked or other textual phrases.

However, if a search engine was not part of the described authentication method or protocol, for example Yahoo™ chose not to participate, an alert signal could be generated which would inform the user that "this search engine does not support web-site authentication, users may continue at their own risk", or some similar type of warning.

There are two or more specific functions that can be provided after the plug-in has been downloaded, for example:

1. An image chosen by an URL owner to describe or to attract a user to visit a web-site or web-page, the image being a logo, trade mark, slogan, thumbnail image of a home page or any image, is placed alongside search results made by a general search of the world wide web, once found.

2. An image may be embedded on a subsequent web-page as a consequence of being diverted from a web-page which is a genuine search result, but after clicking on an image or text a user is diverted to a fake web-site. The present invention through the use of a private/public key quickly and easily identifies the fraudulent attempt and highlights this to the user by a message or alert, presenting the user with an option to abort the linking process to a potentially fake or masquerading web-site or web-page.

Using this invention, possibly in conjunction with SSL or other alternate encryption processes, can highlight the intrusion of unregistered images or phrases and can deter or eliminate masquerading, spamming and other fraudulent activities placed on web-sites or web-pages as an inducement to link to fake web-sites.

Figure 4:
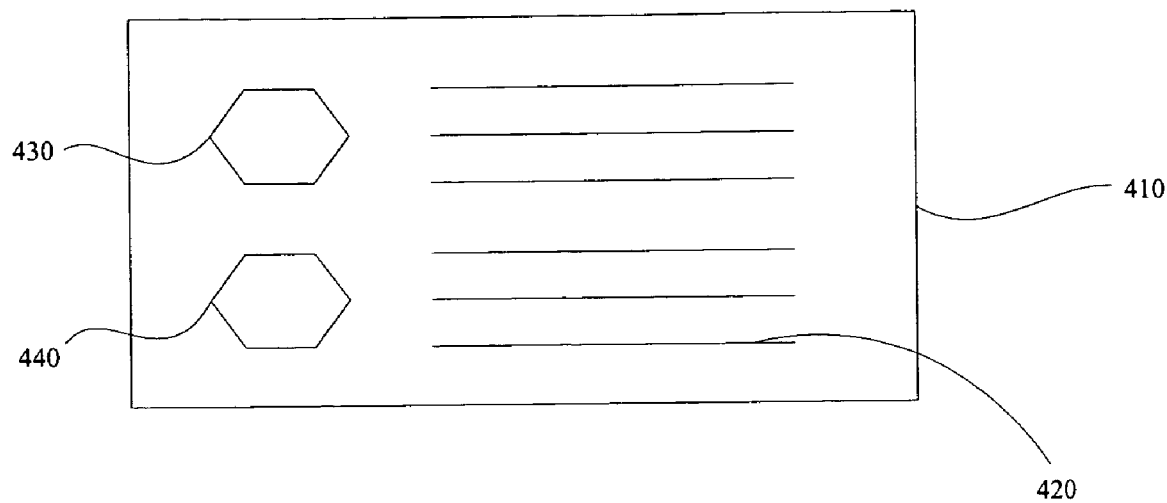
FIG. 4 illustrates an example search results list provided according to a particular aspect of the present invention.

According to one aspect, and referring to FIG. 4, when a user elects to make a search by a search engine and a search results list 410 is retrieved, the search results list may contain at least one entry, or no entries if no search results are found. The search results list 410 could be obtained from a database and can include text, such as hyperlinks 420. Some of those retrieved search result entries may have visual content, such as images 430, 440 which are embedded in the identified web-page(s) or web-site(s), or can be actual mini-images of web-pages.

By providing a protocol which asks URL owners, image owners or authorised users to register a particular image, whereby that image may be a trade mark, logo, icon or any other graphic image, registration provides considerable protection to the owner or authorised user and consumers.

Figure 5:
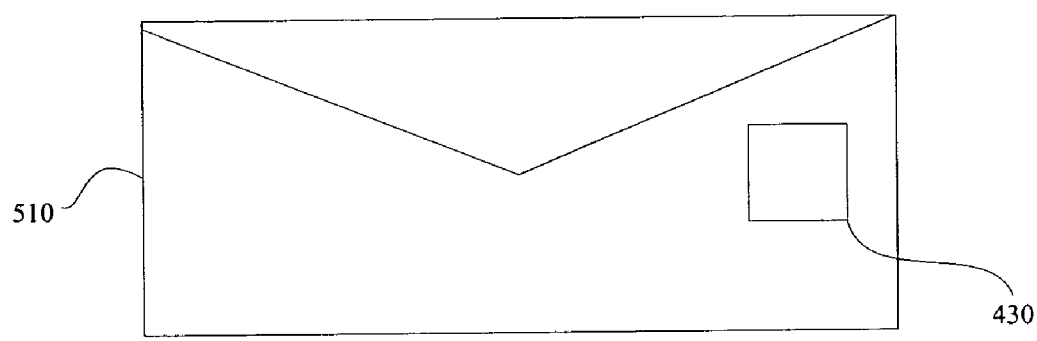
FIG. 5 illustrates an example message provided according to a particular aspect of the present invention.

According to an alternate embodiment of the present invention, senders of emails are able to place a visual image within an email or electronic document which acts as an authenticating stamp/image. This act conveys genuine intent by the sender to be transparent and removes the possibility of phishing, scams or deception. The stamp/image could be placed within an email, or on any other electronic document, including being shown, for example, on an envelope in Outlook Express™ or other programs. Once the stamp (i.e. visual image) is visible, and by moving a computer mouse over, or possibly clicking on, the image, the verification process, as described hereinbefore and hereinafter for search results, could occur to authenticate the visual image. As illustrated in FIG. 5, the stamp/image 430 could be displayed to a recipient as if on a traditional envelope 510.

Email or corporate promotional material emanating from a genuine source can carry within its body a similar stamp/image acting as a security ID, or in the case of an illegal entity the stamp/image would be missing, providing the opportunity to highlight this as a potential fraud, scam, spam or pornography (a worded alert could highlight this and extend a validity signal to assist the authorities to eliminate or deter any of these practices). Thus, there would be an attached stamp/image carrying the ID of the sender and upon arrival the receiver then has the ability to authenticate that the message originated from a genuine URL/sender by authenticating the stamp/image. The ID stamp/image can be on an existing email program, a web-site or in the body of, for example, promotional material. Filtering material allows junk mail or pornography web-sites to be removed or avoided.

The ability to authenticate an organisation or validate the status of a computerised communication at the point of receipt is a significant step in eliminating scam emails or being led to masquerading web-sites.

Figure 6:
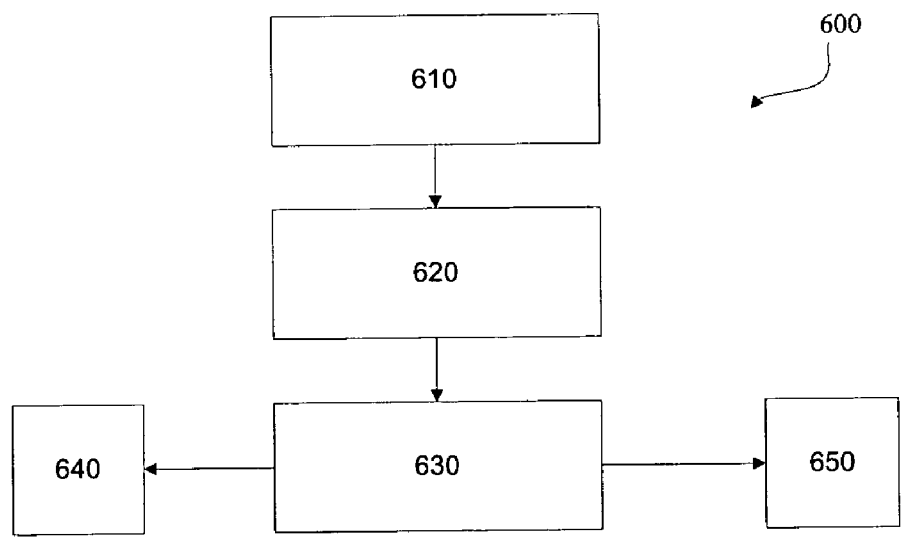
FIG. 6 illustrates an example flow diagram of a protocol that can be utilised to embody or give effect to a particular aspect of the present invention.

According to a further embodiment, and referring to the method 600 illustrated in FIG. 6, at step 610 a logo is presented as a genuine logo of XYZ company on a web-site purporting to be that of XYZ company. The logo, if registered under the present protocol, is able to be displayed as an additive to a search results list at step 620. The logo is also able to be displayed on a locally hosted web-site, or other web-sites by pre-approved consent. Other URL owners seeking to display the logo or to create a link to the XYZ company URL might do so, provided a consent has been obtained. At step 630, software, for example a plug-in in conjunction with remote server software, verifies the logo as authentic and is correctly linked to XYZ company's official web-site or other approved web-site. If authenticated, the logo is included in a search results list at step 640, but if not authenticated, no logo is included as at step 650. A fake web-site which may display the logo or attempt to convey a likeness would thus be impeded from doing so in the search results list of a user's search. If a fake image had a likeness camouflaged by subtle changes such as spelling or other deceptive means, the identification process would readily identify the attempt to take a user to a fake web-site or to obtain confidential information by deception.

An entity may wish to have its web-pages associated with a graphic, so that the link is more meaningful. For example a well known hamburger company may wish that results returned by a search engine that link to hamburger company web-sites have the company's icon displayed. It may also require that no unauthorised display of this icon is used within the search results linking to other web-sites.

A search engine might only be authorised to embed graphics registered by the owner of the intellectual property rights within its search results. A software program is able to crawl the web and identify unauthorised images. The owner of a web-site or URL registers images or other content which is desired to be protected through an authorised facility such as an accredited search engine. The owner of the web-site embeds within a web-page an encoded image which inherently contains authorisation so that the search engine can use both the image within search results for that web-page and check for authorisation. Once authorised, the web-site owner may display an accredited stamp or image on a web-page indicating authenticity.

In one particular, but non-limiting specific example, there could be embedded in a web-page details of the image and authorisation. For example, the following could be used within a web-page:

<searchenginelink="www.myexample.com/mvdir"

Graphic="myicon.png"

Authorisation="fgter65sjgqtsdhtdgpustrdgtud"
EXPIRES=YYYYMMDD/>

In this particular example, a search engine may display the graphic within the search results provided that the search engine confirms the unique number from the image/URL/expiry calculation process, authorisation with an owners public key and verifies that the resultant processed data is the same as the authorisation of the web-page. The search engine could verify that the URL of the link is the same descendant, that the expiry date is current and that the public key is current. A plug-in can be downloaded to help effect these features.

A window or alert button can provide warning messages such as: "We cannot verify that this icon and web page is genuine—do you wish to proceed?".

Before connecting to a web-site a check against a secure encrypted database can be made. If the visual image on the web-page is not registered a warning could state: "An illegal attempt to masquerade has occurred do you wish to report this?".

If a search engine does not use the protocol a warning could state: "This search engine does not support an anti-masquerading protocol—here is a list of search engines that do".

Each server might handle 60,000 downloads per hour which means that caches are able to handle the volume required to set-up the network. Using this system, every browser effectively becomes an enforcement mechanism.

The invention may utilise security tags, SSL or PGP to encrypt, that is to scramble identification data, a protected or registered image, credit details or payment authorisations into unreadable data) then decrypt the data into readable information. In addition, where technically practical, a hologram or readable bar-code may be provided as a security confirmation of an image. Where the availability of equipment allows, a user may be able to swipe a card at a terminal or on a cellular telephone, Palm™, Internet or video phone, PC or any other digital device.

FURTHER DETAILED EXAMPLES OF A PREFERRED EMBODIMENT

The following examples provides a more detailed discussion of particular embodiments of the present invention. The examples are intended to be merely illustrative and not limiting to the scope of the present invention.

Steganography is the art of writing in cipher, or in characters, which are not intelligible except to persons who have a cryptographic key. In computer terms, steganography has evolved into the practice of hiding a message within a larger one in such a way that others cannot discern the presence or contents of the hidden message. In contemporary terms, steganography has evolved into a digital strategy of hiding a file in some form of multimedia, such as an image, an audio file (for example a .wav or .mp3) or even a video file.

Like many security tools, steganography can be used for a variety of reasons. Legitimate purposes can include watermarking images especially in copyright and trade mark material. Digital watermarks (also known as fingerprinting, especially in copyright material) are similar to steganography in that they are overlaid in files, which appear to be part of the original file and are thus not easily detectable by the average person. Steganography can also be used as a way to make a substitute for a one-way hash value (where one takes a variable length input and creates a static length output string to verify that no changes have been made to the original variable length input). Further, steganography can be used to tag notes to on-line images (akin to post-it notes attached to paper files). Finally, steganography can be used to maintain the confidentiality of valuable information, that is to protect data from possible sabotage, theft, or unauthorised viewing by a person.

In a particular form, the present invention confirms that an image has not been altered and is original since released by the author and provides a method to encode information into an image without any noticeable change to the image.

In a further form, the present invention provides a way to decode information stored within an image resulting from decoding software (for example an Internet browser plug-in) directing the user to a predefined location. The "plug-in", also referred to as the Link-Image-Decoder (LID) application, decodes an encoded image, hereinafter referred to as a "link image", validates the link image's integrity and directs the user to a pre-defined location using an associated hyperlink.

Link Image Encoder (LIE)

Figure 7:
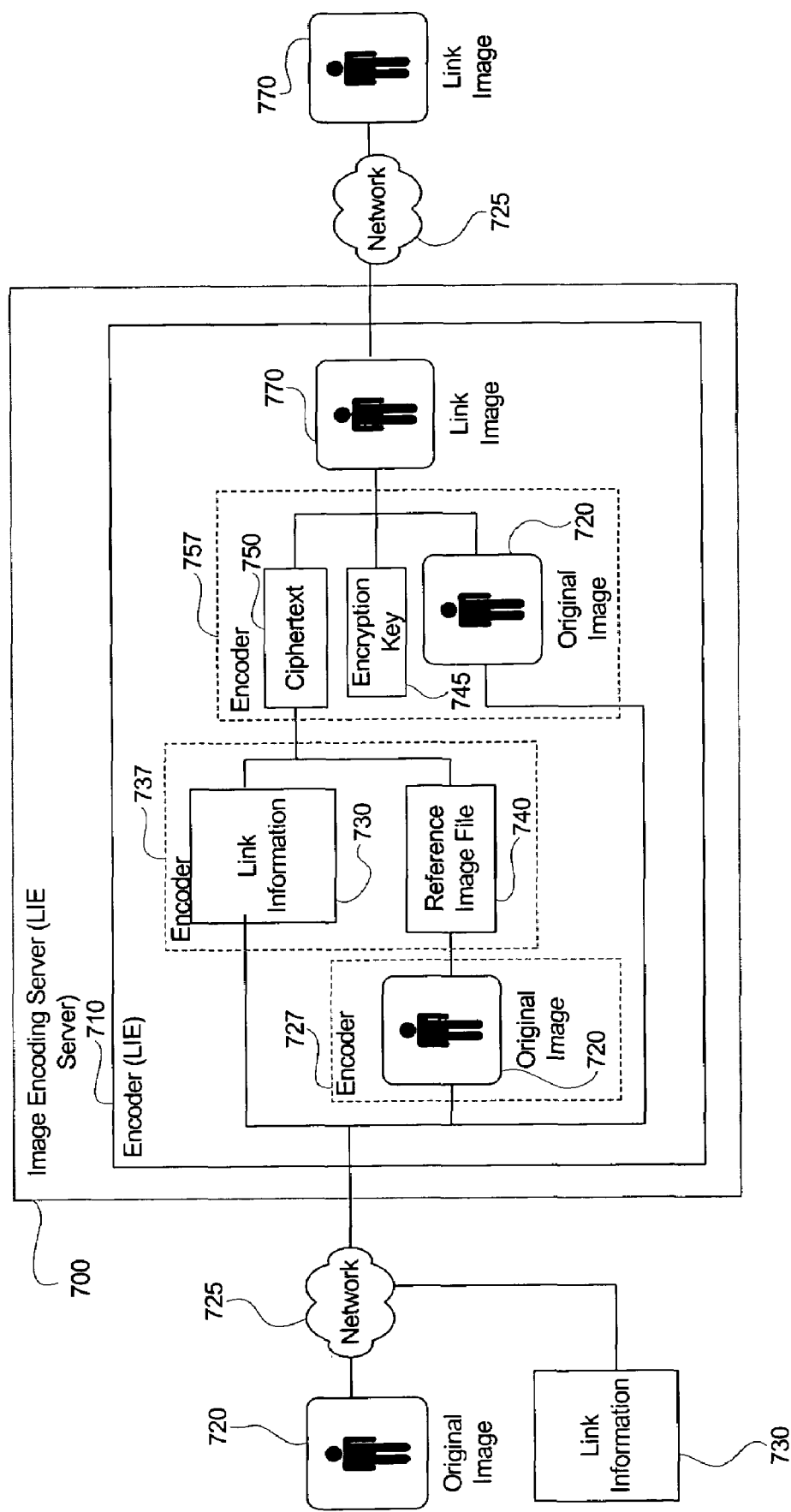
FIG. 7 illustrates an example system diagram for the image encoding process according to a particular aspect of the present invention.

Referring to FIG. 7, a server-side system 700 is illustrated. Image encoding server (i.e. LIE server 700) may be embodied as the processing system 100. LIE server 700 houses a Link Image Encoder (LIE) 710 which is a software application. The LIE 710 encodes an original image 720 rendering the original image 720 decodable by the LID 810 software. The process includes:

(1) An original image 720 is submitted, via a network 725, to the LIE 710 along with link information 730 which is hyperlink information of the correct or authentic URL or network location for the original image 720 when in use;

(2) The LIE 710 identifies the suitability of the original image 720 to be encoded;

(3) The LIE 710 analyses and/or encodes the original image 720 using encoder module 727 and generates a mathematical summary, in a particular embodiment being an image hash file, herein termed a reference image file 740, of the original image 720 based on the image's pixels and/or other properties;

(4) The reference image file 740 and link information 730 are then encrypted into ciphertext 750 (base code) using encoder module 737 (which may or may not be the same as encoder module 727);

(5) The original image 720 is encoded with the ciphertext 750 using encryption key 745 and encoder module 757 (which may or may not be the same as encoder modules 727, 737) and the process of steganography;

(6) The resulting encoded image, that is the link image 770, can be stored and visually appears the same as the original image 720 to the naked eye;

(7) The link image 770 can then be transmitted or retrieved, for example via network 725, for general use, such as on a web-site or in an electronic document, email, etc.

The process of combining the ciphertext 750 and the original image 720 using steganography uses a secret encryption key 745 which is located in both the LID 810 and LIE 710, symmetric encoding is performed between the original image 720 and ciphertext 750 using steganography. The resulting encoded image 770 is output ready to be used/deployed.

Link Image Decoder (LID)

Figure 8:
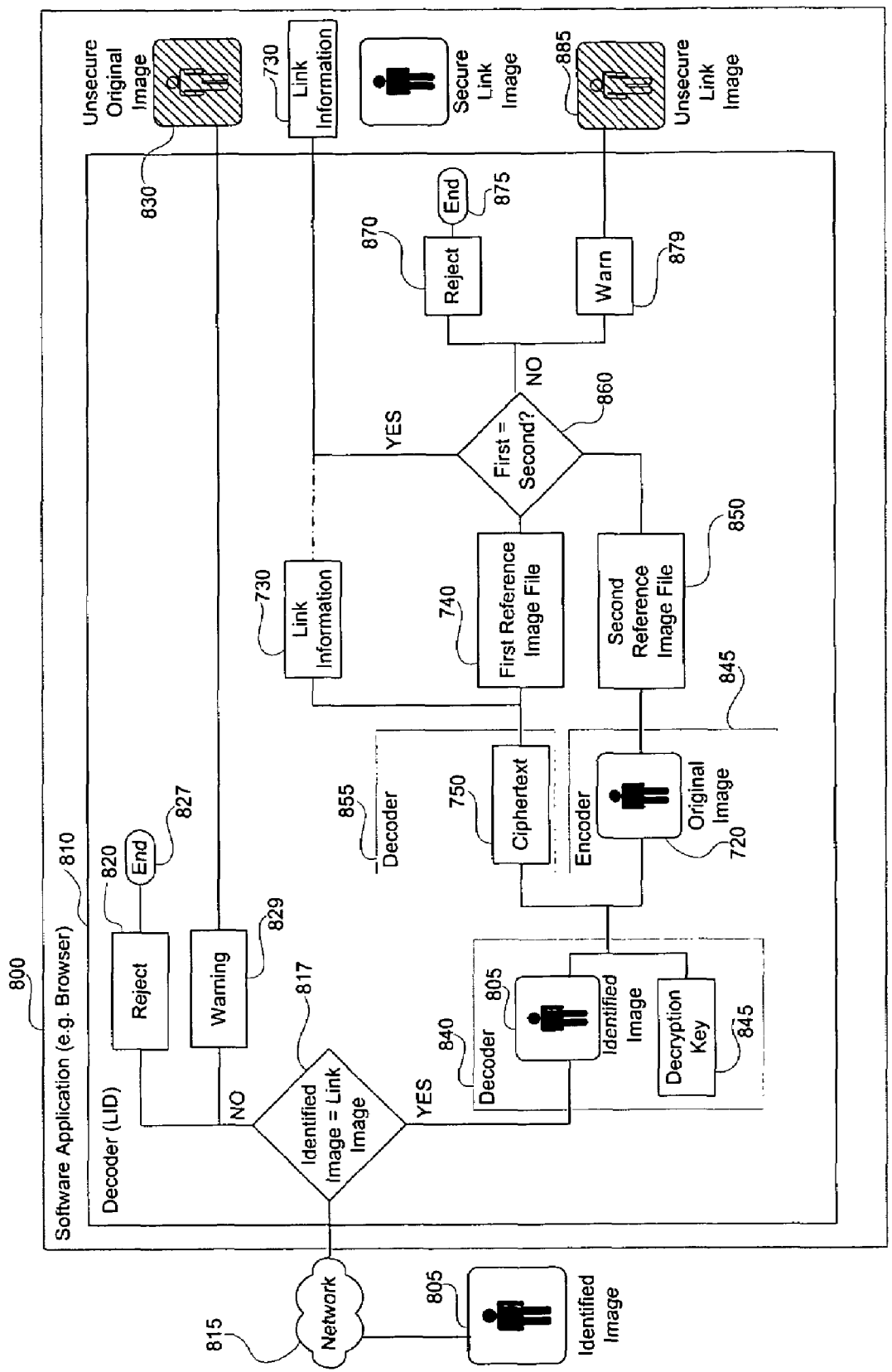
FIG. 8 illustrates an example system diagram for the image decoding process according to a particular aspect of the present invention.

Referring to FIG. 8, a client-side system is illustrated. A terminal houses a software application 800, for example the software application 800 may be a web browser. The software application 800 includes a software component being the Link Image Decoder (LID) 810, which may be incorporate with the software application 800 for example as a plug-in for a web browser, or may simply be interoperable with the software application for example as a stand-alone piece of software.

The LID 810 analyses each identified image 805 loaded into the software application 800, for example via network 815, the LID 810 identifies which links to identified images 805 contain valid link images 770 and which links to images do not at step 817. This is achieved by looking for identified images 805 which contain unique pixel values which are found only in link images 770 which use the LIE 710 encoding process.

If the LID 810 determines that the identified image 805 is not a link image 770 at step 817, then the identified image 805 may be rejected 820 and the decoding process ended 827, or the identified image 805 may be used by the software application 800 with a warning or notification 829 given to the user. For example, identified image 805 may be displayed in a search results list as an altered image 830, eg. highlighted or shaded, to indicate it is an unsecure or non-authenticated image. In one particular form, the LID 810 could superimpose a colour over or around images 830 and/or image links, for example translucent red on images links which are not link images 770 and green over images which are valid link images 770, or simply some other type of notification or warning.

When a user selects an identified image 805 which appears to be a link image 770 encoded by the LIE 710, the LID 810 can carry out the following steps:

(1) Decode, using decoder 840, the identified image 805, which has been determined to be a link image type, using a steganography engine and built-in decryption key 845, to obtain the original image 720 and c aiphertext 750;

(2) Process the decoded identified image 805 (i.e. the original image 720) using encoder 845 to generate a second reference image file 850;

(3) Decode the ciphertext 750 using decoder 855 into a first reference image file 740 (being the reference image file 740 from FIG. 7) and link information 730;

(4) Verify the first reference image file 740 is the same as the second reference image file 850 at step 860;

(5) If the LID 810 using comparison component 860 determines that the first reference image file 740 and second reference image file 850 are not the same, then the original image 720 may be rejected 870 and the authenticating process ended 875, or the original image 720 may be used by the software application 800 with a warning or notification 879 and the original image 720 may be displayed in a search results list as an altered image 885 to indicate it is an unsecured or non-authenticated image;

(6) If all previous steps are successful, including that the first reference image file 740 and second reference image file 850 are the same, them the LID 810 can instruct the software application 800 to use the obtained link information 730, for example a web browser could then load the resulting link information 730 associated with the original image 720.

In this particular form of the present invention, the steganography process used means that the cipher can only be revealed if the correct key is used. There is no "look ahead", i.e. the process of the LID or any steganography decoding tool works as the image needs to be decoded before the cipher can be revealed. This process takes a certain amount of time. Even if the cipher can be discovered, the next challenge is to decrypt the cipher encryption formula. The strength of this encryption can be very high as the link information should be a relatively small amount of text. If the cipher is discovered, then a hacker would know the process used to generate the image by steganography, in this case, although the hacker would not be able to read the cipher, the hacker would know to what link it connected. An additional process of combining the image hash with the cipher would add yet another layer of protection.

Hence, in one particular form, the invention may utilise: (1) an image processed and encrypted into a hash file, or alternatively any other suitable type of encrypted or compressed image file; (2) hash and link information then encrypted into ciphertext; and (3) ciphertext encoded into an image using a steganography process which is also encoded with a secret key. Thus, there may be three layers of protection, each of which are as secure as the encryption level chosen, for example SSL 128 bit, etc. A person (for example a hacker or coder) would need to decrypt each stage before the data could be entered into the next stage.

The decoding process is preferably performed on a user terminal. The skilled person may ask: if the LID takes the information it decodes from a link-image and decrypts that information to resolve the ultimate instruction, why use steganography at all? Although not an essential feature of the present invention generally, the preferred embodiment makes use of steganography. Using steganography to encrypt information in the present manner is unique in its own right and also provides another layer of security.

The skilled person may also ask: if the LIE is an application in the public domain then is it possible that the encoding process would be more susceptible to reverse engineering or hacking techniques making the process less secure? I.e. if one has an encoded image and a decoded image, and one has the LIE, would it be an easier brute force hack than if the LIE was an application running based on a submission server which receives images, encodes and redeploys? In answer to this, a symmetric encoding (public and private key) is not needed as the LIE and LID have the required keys built into the applications. Therefore one is free to use symmetric encoding without worry as one does not need to communicate the original key.

Secure Link Image Director (SLID)

In a further non-limiting embodiment, the present invention seeks to provide a method or system that can stop a validated link author from using the method or system. That is, in the case where links which have been validated by a user has in some way infringed terms of usage where the protocol of registering a visual image has been ignored.

The SLID is a server which operates directly with the LID plug-in on a user's terminal. The SLID is a server on the Internet which operates much like a DNS server as follows. When a user has selected a valid link image, the LID sends the link request to the SLID server. The SLID server looks up the link request against its database and verifies that the client/user who holds the rights to the link is valid and authorised to use the link. Once confirmed, the SLID server sends an acceptance to the user LID to link onwards. Information sent/received using a SLID server may not necessarily be link information, i.e. a cipher which corresponds to a link account on the SLID could be used. For example, when the LID sends information to the SLID server, the information could be 10101001010 which could mean it is requesting a link which that code represents. The SLID server would then return the correct link address.

With such a process several features are available, including: (1) a link image owner may update a link to an alternative web-site by having the SLID server provide alternative link information; (2) an administrator can deactivate a link image account holder or redirect a link image to any location; and (3)

information regarding the user, user's IP address and other source material is known to the SLID server.

LIE Server

The LIE server can be located in the public domain allowing a client/user to access his or her account and submit images to be encoded by the LIE process to a predefined link. A client may have one or more links which have been authorised to an account, allowing a client to select the links the client wants to encode to which images.

The appearance of the LIE interface could operate on the basis of a simple link inbox, i.e. it may be a folder which has an inbox and an outbox. For example, IN—www.company-.com and OUT—www.Company.com. The client/user could drop images to the inbox and the LIE would encode these images with the corresponding link and copy the resulting encoded image to the outbox.

Alternatives, such as tools which monitor a client's web-site could also be used. For example, the LIE could be adapted to monitor a web-site and if a new image is detected on that web-site the LIE could copy and encode the new image. A client's account in the LIE could be managed via a secure web interface, the process could be accessed via https SSL type secure protocol with a username and password required to access and manage link image production. If used, the SLID server could also use a similar https SSL. A public private key system for exchanges of information between the LID and SLID could be used and internal keys built within the LID and SLID systems could allow users connecting to the SLID to not require a password.

In an alternate embodiment of the present invention, the invention provides a database/directory of intellectual property that is able to be searched and viewed at one source, for example via a single web-page interface. Where authors or owners desire to identify the date and time of creation, this particular embodiment provides a world wide web intellectual property database at one source deriving from one or more servers associated with an author and not requiring a user to search multiple sources, for example separate databases in different countries. Thus, trade marks, slogans, sketches, artistic works, etc., are able to undergo a verification process which sets the time and date of creation and can subsequently be searched on-line at a single searching source through a dedicated portal. For example, instead of searching for a trade mark in the USPTO trade mark database then having to search a European trade mark database and then repeating the search in other countries, the present invention simplifies this process and addresses the obvious current problems and inadequacies. There may additionally be provided text carrying a copyright notice applied to an encrypted image which is embedded in the image, but which is not normally visible. In a further example, a security frame or icon could be placed alongside the image, trade mark, design, artistic work, etc.

Thus, there has been provided in accordance with the present invention a method, system and/or computer readable medium of instructions for facilitating the authentication of a web-site, or at least of images or the like contained therein; and/or a method, system and/or computer readable medium of instructions for facilitating the authentication of an email, or other type of electronic document, or at least of images or the like contained therein.

The invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The invention claimed is:

1. A method performed by a processing system including a processor and a memory for checking an authenticity of an identified image, the method comprising the steps of:
   receiving, the identified image by a software application stored in the memory and executable by the processor;
   checking by the software application executed by the processor that the identified image is an encoded image, whereby an encoded image includes at least an original image and link information in an encoded form; and
   decoding the identified image to obtain the link information and a first reference image file and a second reference image file; and
   comparing the first reference image file and the second reference image file, and if a match is identified, providing the link information.

2. The method as claimed in claim 1, wherein the identified image is firstly decoded into ciphertext and the original image.

3. The method as claimed in claim 2, wherein the first reference image file is obtained from the ciphertext.

4. The method as claimed in claim 1, wherein the second reference image file is obtained from the original image.

5. The method as claimed in claim 3, wherein the link information is obtained from the ciphertext.

6. The method as claimed in claim 1, wherein the first reference image file and the second reference image file are image hash files.

7. The method as claimed in claim 1, wherein the encoded image is a link image 30 which is obtained from ciphertext and the original image.

8. The method as claimed in claim 7, wherein the ciphertext is firstly obtained from the link information and a reference image file formed from the original image.

9. The method as claimed in claim 1, wherein the software application is a webbrowser.

10. The method as claimed in claim 9, wherein the method is embodied as a plug-in to the web browser.

11. The method as claimed in claim 9, wherein the identified image is part of a website and providing the link information to the web browser allows a user to link to the website.

12. The method as claimed in claim 1, wherein the software application is an email program.

13. The method as claimed in claim 1, wherein the identified image is identified by an Internet search engine.

14. The method as claimed in claim 1, wherein if the identified image is not an encoded image notification is provided.

15. A method of facilitating the authentication of a web-site, the method including the steps of:
   receiving an original image and link information at a server to be encoded into an encoded image;
   providing a software application adapted to check that an identified image, from a search results list, is an encoded image, and
   (A) decoding the identified image to obtain the link information and a first reference image file and a second reference image file; and (B) comparing the first reference image file and the second reference image file, and if a match is identified, providing the link information to enable linking to the web-site.

16. The method as claimed in claim 15, wherein the search results list is obtained from a database which includes images.

17. The method as claimed in claim 15, wherein if the identified image is not an encoded image, the identified image is not transmitted as part of the search results list or an indication is provided in the search results list that the identified image is not authenticated.

18. The method as claimed in claim 15, wherein a user is able to view the identified image without being required to activate a hyperlink to the associated website.

19. The method as claimed in claim 15, wherein the identified image is a video or a sequence of images.

20. The method as claimed in claim 15, wherein the link information is required to be validated by a remote server prior to providing the link information.

21. A processing system including a processor and a memory,
   the processing system being configured for checking an authenticity of an identified image, the system comprising:
   a software application stored in the memory and executable by the processor to receive the identified image and to check that the identified image is an encoded image, whereby an encoded image includes at least an original image and link information in an encoded form;
   at least one decoder configured to decode the identified image to obtain the link information and a first reference image file and a second reference image file; and
   a comparison component configured to compare the first reference image file and the second reference image file, and if a match is identified, provide the link information.

22. The processing system as claimed in claim 21, wherein the software application is a web browser.

23. The processing system as claimed in claim 22, wherein the at least one decoder and the comparison component are part of a browser plug-in.

24. The processing system as claimed in claim 21, wherein the software application is or is part of an email program.

25. The processing system as claimed in claim 21, wherein the software application communicates with a remote server to validate the link information.

26. The processing system as claimed in claim 21, wherein the encoded image is a link image.

27. A non-transitory computer readable storage medium with an executable program stored thereon for checking an authenticity of an identified image, wherein program instructs a microprocessor to perform the steps of:
   receiving the identified image;
   checking that the identified image is an encoded image, whereby an encoded image includes at least an original image and link information in an encoded form; and
   decoding the identified image to obtain the link information and a first reference image file and a second reference image file; and
   comparing the first reference image file and the second reference image file, and if a match is identified, providing the link information.

28. The computer readable storage medium of claim 27, wherein the instructions are part of a web-browser.

29. A system for checking the authenticity of an image, the system including:
   a server adapted to receive an original image and link information associated with the original image and to generate a reference image file and an encoded image; a terminal adapted to receive an identified image, the terminal also adapted to:
   check that the identified image is an encoded image; and
   decode the identified image to obtain the link information and at least two reference image files; compare the at least two reference image files; and
   if a match is identified, use the link information.

30. The system as claimed in claim 29, wherein the terminal is adapted to perform the method of any of claims 2 to 14.

31. The system as claimed in claim 29, wherein the image is a proprietary image.

32. The system as claimed in claim 31, wherein the system provides a searchable database of images.

33. A system for providing a searchable database of images, the system including:
   an encoder to encode an original image with link information to provide an encoded image;
   a database to store the encoded image;
   a server associated with the database to facilitate searching of the database;
   a software application to receive an identified image and to check that the identified image is an encoded image, whereby the encoded image is part of the searchable database and includes at least an original image and link information in an encoded form;
   at least one decoder to decode the identified image to obtain the link information and a first reference image file and a second reference image file; and,
   a comparison component to compare the first reference image file and the second reference image file, and if a match is identified, provide the link information.

34. The system as claimed in claim 33, wherein the original image is a proprietary image.

* * * * *